(12) United States Patent
Brant et al.

(10) Patent No.: US 9,195,448 B2
(45) Date of Patent: *Nov. 24, 2015

(54) CACHING AND ANALYZING IMAGES FOR FASTER AND SIMPLER CLOUD APPLICATION DEPLOYMENT

(71) Applicant: International Business Machines Corporation, Armonk, NY (US)

(72) Inventors: Charles D. Brant, Raleigh, NC (US); ChunHui Y. Higgins, Raleigh, NC (US); William P. Higgins, Durham, NC (US); John L. Ryding, III, Quincy, MA (US); Andrew N. Trossman, North York (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,656

(22) Filed: Jul. 18, 2014

(65) Prior Publication Data

US 2015/0172107 A1    Jun. 18, 2015

Related U.S. Application Data

(63) Continuation of application No. 14/104,335, filed on Dec. 12, 2013.

(51) Int. Cl.
*G06F 9/445* (2006.01)
*H04L 12/24* (2006.01)
*H04L 29/08* (2006.01)

(52) U.S. Cl.
CPC ............... *G06F 8/61* (2013.01); *H04L 41/082* (2013.01); *H04L 67/2852* (2013.01)

(58) Field of Classification Search
CPC ..................................... G06F 8/61; G06F 8/71
USPC .................................. 717/120–122, 168–178
See application file for complete search history.

(56) References Cited

U.S. PATENT DOCUMENTS

| 8,347,263 B1 * | 1/2013 | Offer ........................... 717/104 |
| 8,438,559 B2 * | 5/2013 | Naslavsky et al. ............ 717/174 |
| 8,762,642 B2 * | 6/2014 | Bates et al. ................... 711/118 |

(Continued)

OTHER PUBLICATIONS

Chiu, D. et al.; "Evaluating caching and storage options on the Amazon Web Services Cloud"; Proceedings 11th IEEE/ACM Interna'l Conference on Grid Computing (GRID 2010); pp. 17-24; IEEE Computer Society; 2010.

(Continued)

*Primary Examiner* — Ted T Vo
(74) *Attorney, Agent, or Firm* — Joseph J. Petrokaitis; Thomas E. Tyson; Gregory K. Goshorn

(57) ABSTRACT

Techniques provide include analyzing a first node, associated with a first version of an service, to extract first configuration metadata; analyzing the first node, associated with a second version, subsequent to the first version, of the a service, to extract second configuration metadata; determining, based upon a comparison of the first configuration metadata and the second configuration metadata, that the first node has not been modified between the first version and the second version; generating a first image of the node for distribution in conjunction with the service in response to the determining that the particular node has not been modified; and caching the first image for use in conjunction with the service.

9 Claims, 5 Drawing Sheets

(56) References Cited

U.S. PATENT DOCUMENTS

| | | |
|---|---|---|
| 2012/0066682 A1 | 3/2012 | Al-Aziz et al. |
| 2012/0131578 A1 | 5/2012 | Ciano et al. |
| 2014/0075426 A1* | 3/2014 | West et al. .................... 717/171 |
| 2014/0282472 A1* | 9/2014 | Vinograd et al. ............. 717/170 |

OTHER PUBLICATIONS

Anonymous; "System and method of rediscovering orphaned Virtual Machines in a managed cloud environment"; http://priorartdatabase.com/IPCOM/000216963; Apr. 25, 2012.

Johnson, E. et al.; "IBM Reference Configuration for Microsoft Private Cloud: Deployment Guide"; IBM Corporation; www.ibm.com/redbooks/redp4828-00; Dec. 2011.

"A Method for Storing a Set of Reference Images in a Reference Repository for Versioning and Distribution," Doc. No. IPCOM000215393D at <www.ip.com>, Feb. 24, 2012.

"A Method for Searching for Similar Images from a List of Virtual System Images and Doing Detailed Comparisons to Understand Differences," Doc. No. IPCOM000215395D at at <www.ip.com>, Feb. 24, 2012.

* cited by examiner

CACHING AND ANALYZING IMAGES FOR FASTER AND SIMPLER CLOUD APPLICATION DEPLOYMENT

CROSS-REFERENCES TO RELATED APPLICATIONS

The present application is a continuation and claims the benefit of the filing date of an application entitled, "Caching and Analyzing Images for Faster and Simpler Cloud Application Deployment" Ser. No. 14/104,335, filed Dec. 12, 2013 assigned to the assignee of the present application, and herein incorporated by reference

FIELD OF DISCLOSURE

The claimed subject matter relates generally to cloud-based computing and, more specifically, to techniques for generating one or mere cloud images based an analysis of changes to various nodes within a service.

BACKGROUND OF THE INVENTION

One definition of cloud computing is network-based services which appear to be provided by virtual hardware running on one or more real machines. Typically, cloud-based services run on multiple connected computers, often over a real-time network such as the Internet. A cloud image is a file that contains the contents of an operating system (OS) plus additional software that can be instantiated on a cloud management system as one or more running virtual computing nodes, commonly called "instances." One advantage of using cloud images is that a system may be shut down and restored later to the exact same state. Cloud management systems such as AMAZON EC2® and IBM SMARTCLOUD® employ cloud images as a basic unit of deployment.

A cloud-based service is simply a collection of one or more virtual machines that work together to provide some capability to a deploying organization or its clients. Benefits of cloud images in conjunction with cloud-based services may include 1) a fixed configuration that can deploy in a reliable and consistent manner; and 2) well-known optimization techniques such as copy-on-write that can lead to very fast instance deployment times and reduced storage costs.

SUMMARY

Provided are techniques for optimizing cloud-based service development, including deployment of a service under development to a test cloud, analyzing changes to nodes of the service, capturing images based upon parts of nodes that are not frequently changing and deploying the images in conjunction the non-frequently changing nodes in a non-image format.

Techniques provided include analyzing a first node, associated with a first version of a service, to extract first configuration metadata; analyzing the first node, associated with a second version, subsequent to the first version, of the service, to extract second configuration metadata; determining, based upon a comparison of the first configuration metadata and the second configuration metadata, that the first node has not been modified between the first version and the second version; generating a first image of the node for distribution in conjunction with the service in response to the determining that the particular node has not been modified; and caching the first image for use in conjunction with the service.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
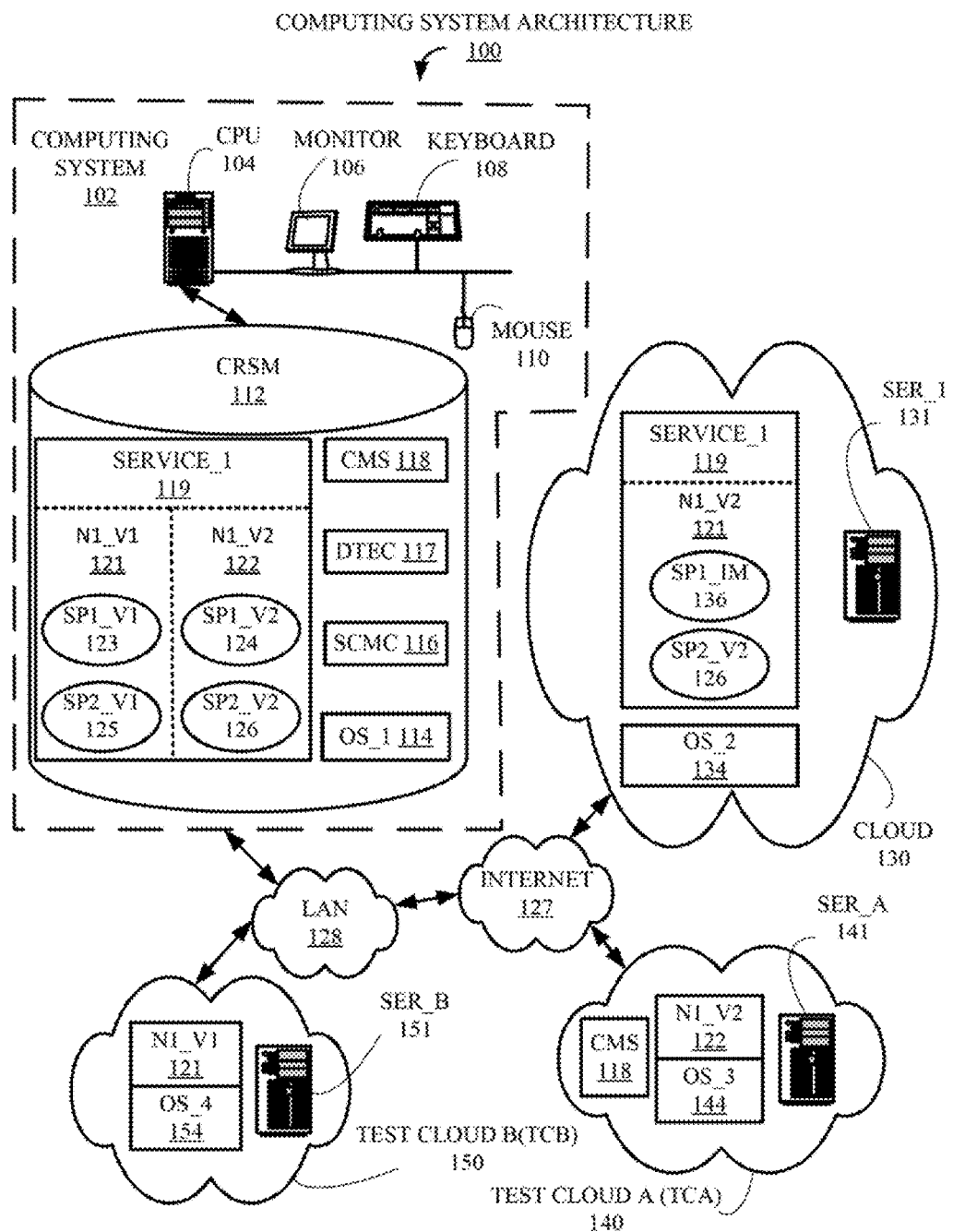
FIG. 1 is an example of one computing system architecture that may implement the claimed subject matter.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service, delivery for enabling convenient, on demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model ma include at least five characteristics, at least three service models, and at least four deployment models.

Characteristics are as follows:

On-Demand Self-Service: a cloud consumer can unilaterally provision computing capabilities, such as server time and network storage, as needed automatically without requiring human interaction with the service's provider.

Broad Network Access: capabilities are available over a network and accessed through standard mechanisms that promote use by heterogeneous thin or thick client platforms (e.g., mobile phones, laptops, and PDAs).

Resource Pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid Elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured Service: cloud, systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private Cloud: the cloud infrastructure is operated solely for an organization. It may be managed by the organization or a third party and may exist on-premises or off-premises.

Community Cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public Cloud: the cloud infrastructure is made available to the general public or a large industry group and is owned by an organization selling, cloud services.

Hybrid Cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected, nodes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing, in the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention, it will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the function/acts specified in the flowchart and/or block diagram block or blocks.

As the Inventors herein have realized, there are two basic problems with the capture of cloud images from instances. Firstly, image capture is time consuming and computationally expensive. Secondly, because images are monolithic, as you make changes to the contents of an image, there may be many similar images that are expensive and complicated to manage. This issue is known as "image sprawl."

Turning now to the figures. FIG. 1 is a block diagram of one example of computing system architecture 100 that may implement the claimed subject matter. A computing system 102 includes a central processing unit (CPU) 104, coupled to a monitor 106, a keyboard 108 and a pointing device, or "mouse," 110, which together facilitate human interaction with computing system 100 and computing system 102. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown).

CRSM 112 is illustrated storing an operating system (OS) 114, a Source Control Management Client (SCMC) 116, a Development/Test Environment Client (DTEC) 117 and a Cloud Management System (CMS) 118, which implements aspects of the claimed subject matter. Also stored in CRSM 112 is a service, or "Service_1," 119, which is used throughout the Specification as an example of a service that is built and maintained in accordance with the claimed subject matter. Typically, SCMS 116 works in conjunction with a Source Control Management Server (not shown) residing on a separate server (not shown) since, it would be shared by many development team members. In a similar fashion. DTEC 117 would typically work in conjunction with a Development/Test Environment Server (not shown) on a another server (not shown). SCMC 116 and DTEC 117 are typical source control and build/test, client utilities, respectively, and should be familiar to those with skill in the relevant arts.

CMS 118 is described in more detail below in conjunction with FIGS. 2-5, In this example, service_1 119 includes a number of systems, or "nodes," i.e., a first node, version 1, or "N1_V1," 121 and a first node, version 2, or "N1_V2," 122, which are versions 1 and 2, respectively, of the same node. Nodes such as N1_V1 121 and N1_V2 122 are built and maintained in accordance with the claimed subject matter. Each of nodes 121 and 122 include software packages. In this example, N1_V1 121 includes a first software package, version 1, or "SP1_V1," 123 and a second software package, version 1, or "SP2_V1," 125, N1_V2 122 includes the first software package, version 2, or "SP1_V2," 124 and the second software package, version 2, or "SP2_V2," 126. It should be understood that a service may include many more than two (2) nodes and that nodes may include more than two (2) software packages but, for the sake of simplicity, only two of each are shown.

Computing system 102 and CPU 104 are connected to the Internet 127 and a local area network (LAN) 128. Internet 127 is communicatively connected to a cloud 130, which includes a server, i.e., a ser_1 131. Cloud 130 is illustrated storing an OS, or "OS_2," 134 and a version of service 119 that includes N1_V1 121, which in turn includes SP2_V2 126 and a cloud image of SP1_V1, or a SP1_IM 136. Internet 127 is also coupled to a test cloud A, or "TCA," 140, winch includes a server, a ser_A 141, an OS, or "OS_3," 144, CMS 118 and N1_V2 122. LAN 128 is coupled to a test cloud B, or "TCB," 150, which includes a server, i.e., a ser_B 151, an OS, or "OS_4," 154 and N1_V1 121

Although in this example, computing system 102 and clouds 130 and 140 are communicatively coupled via the Internet 127, they could also be coupled through any number of communication mediums such as, but not limited to, LAN 128, direct wire of any other communication medium. In a similar fashion, computing system 102 and TCA 150 may be connected by means of different communication mediums. It should be noted there are many possible computing system configurations, of which architecture 100, computing system 102 and clouds 130, 140 and 150 and the various configurations of clouds 130, 140 and 150 are only simple examples used merely for describing the claimed subject matter.

Figure 2:
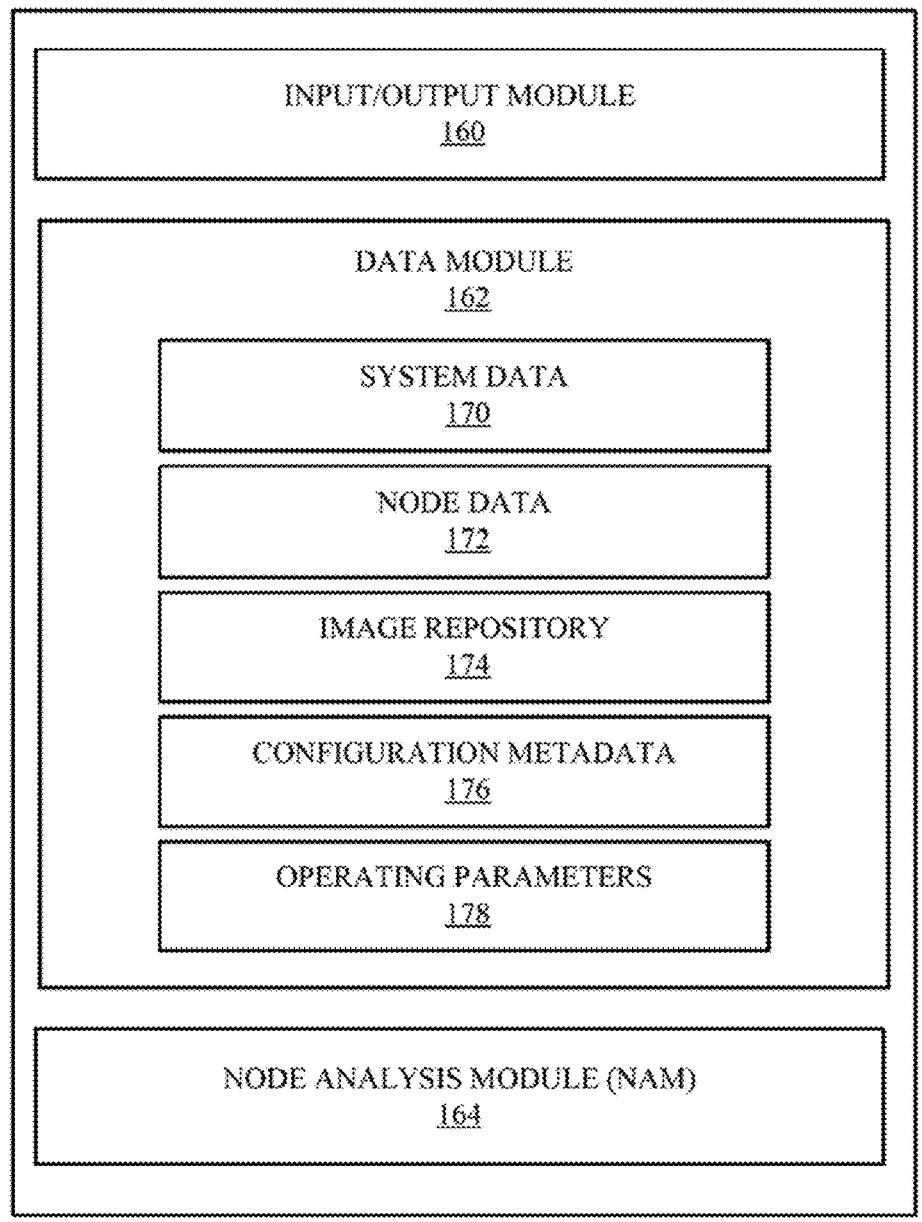
FIG. 2 is a block diagram of an example of a Cloud Management System (CMS) that may implement the claimed subject matter.

FIG. 2 is a block diagram of CMS 118, first introduced above in conjunction with FIG. 1, in more detail. CMS 118 includes an input/output (I/O) module 160, a data module 162 and a node analysis module (NAM) 164. For the sake of the following examples, logic associated with CMS 118 is stored on data storage 112 (FIG. 1) and executes on one or more processors (not shown) of computing system 102 (FIG. 1). It should be understood that the claimed subject matter can be implemented in many types of computing systems and data storage structures but, for the sake of simplicity, is described only in terms of computer 102 and system architecture 100 (FIG. 1). Further, the representation of backup monitor in FIG. 2 is a logical model. In other words, components 160, 162 and 164 may be stored in the same or separates files and loaded and/or executed within system 100 either as a single system or as separate processes interacting via any available inter process communication (IPC) techniques.

I/O module 160 handles any communication CMS 118 has with other components of system 102 and architecture 100. Data module 162 is storage for information that CMS 118 requires during normal operation. Examples of the types of information stored in data module 162 include system data 170, node data 172, an image repository 174, configuration metadata 176 and operating parameters 178. System data 170 stores information on the various systems with which CMS 118 must interact, including, but not limited to, cloud 130 (FIG. 1), TCA 140 (FIG. 1) and TCB 150 (FIG. 1). Node data 172 stores information on services, such as service_1 119 (FIG. 1), and their related nodes and software packages that may be built and maintained in accordance with the claimed subject matter. Such information may include, but is not limited to, the identity of nodes, such as N1_V1 121 (FIG. 1) and N1_V2 122 (FIG. 1).

Image repository 174 stores cached images generated in accordance with the claimed subject matter. Configuration metadata 176 stores information on builds of services such as, but not limited to, current and historical information of the version number, other identifying features of individual nodes that make up a particular build of an service and the software packages and their versions installed on each distinct node type. Image repository 174 and configuration metadata 176 are described in more detail below in conjunction with FIGS. 3-5. Operating parameters 178 includes information on various user or administrative preferences that have been set. For example, an administrator may determine a threshold corresponding to a rate of change that determines whether a particular node is created as an image.

NAM 164 analyzes builds generated in conjunction with SCM 116 (FIG. 1) and DIE 117 (FIG. 1) to determine a corresponding rate of change in the different parts of each particular node. For example, parts of N1_V1 121 may remain static throughout a particular number of builds, specified by a parameter stored in operating parameters 158, and parts of N1_V2 122 may change a number of times within that particular number of builds. For example on a web app node an OS and middleware may rarely change but an an application such as a JEE WAR file might change every time, NAM 146 detects and notes these changes. NAM 146 also analyzes the generated node information to establish a plan for a next build, including whether or not any particular node should be generated as an image. The functionality of NAM 146 is described in more detail below in conjunction with FIGS. 3-5.

Figure 3:
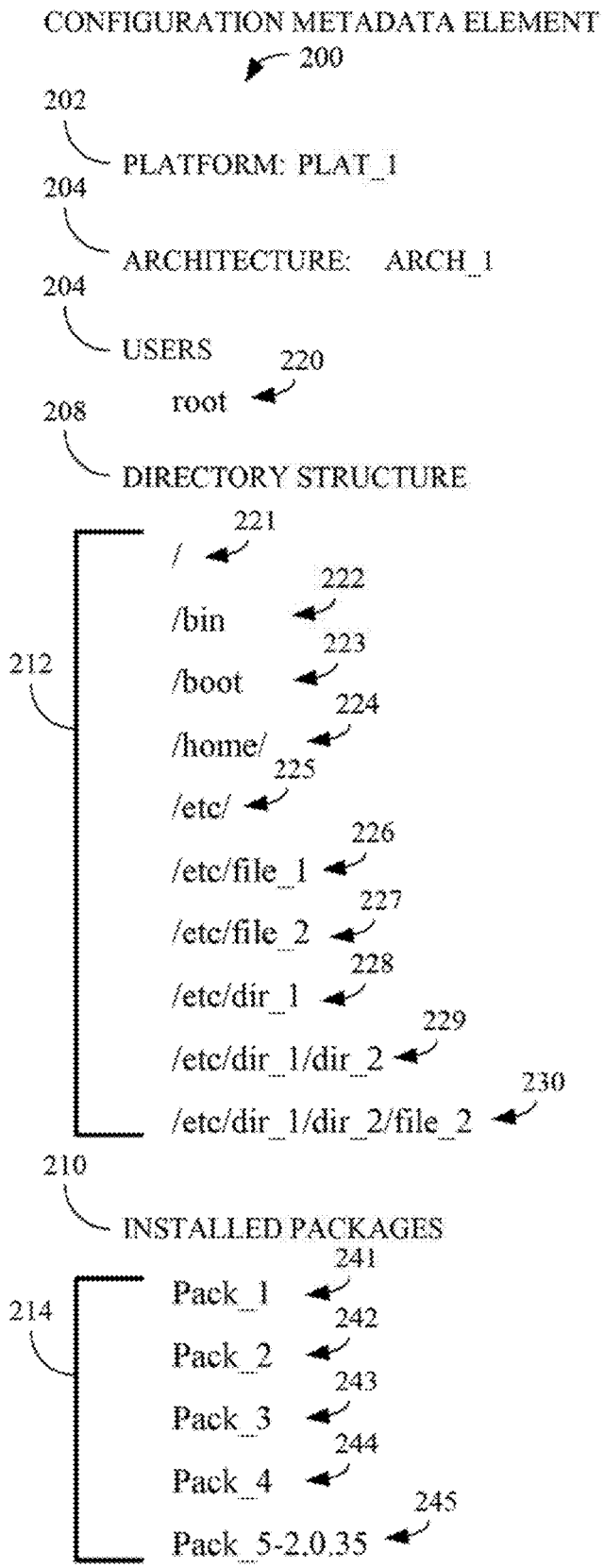
FIG. 3 is a block diagram of one example of an element of configuration metadata used in conjunction with the claimed subject matter.

FIG. 3 is a block diagram of one example of a configuration metadata element (CME) 200 of configuration metadata 176 (FIG. 2) used in conjunction with the claimed subject matter. In this example, CME 200 represents information stored in configuration metadata 176 about service_1 119 (FIG. 1). CME 200 includes a platform section 202, an architecture section 204, an users section 206, a directory structure 208 and an installed packages section 210. Platform 202 indicates that service_1 119 executes on a particular platform, or "plat_1." Architecture 204 indicates that service_1 119 is associated with a particular architecture, or "arch_1." Users 206 indicates that the only user in this example is "root."

Directory structure 208 includes of number of files and directories 212 associated with service_1 119, including "/" 221, "/bin" 222, "/boot/" 223, "/home/" 224, "/etc/" 225, "/etc/file_1" 226, "/etc/file_2" 227, "/etc/dir_1" 228. "/etc/dir_1/dir_2" 229 and "/etc/dir_1/dir_2/file_2" 230. Files and directories 212 of directory structure 208 are used only as examples of a variety of elements that might be in a directory structure.

Installed packages 210 includes examples of some installed packages 214 that might be associated with an service such as service_1 119. This example includes a pack_1 241, a pack_2 242, a pack_3 243, a pack_4 244 and a pack_5-2.0.35 245. Individual files and directories 221-230 and installed packages 241-245 are used merely as examples of elements of service_1 119 that might change at different rates throughout multiple builds and thus be handled differently by CMS 118 (FIGS. 1 and 2) during a build. Processing associated with the build processes based upon the corresponding rates of in accordance with the claimed subject matter is described in detail below in conjunction with FIGS. 4 and 5.

Figure 4:
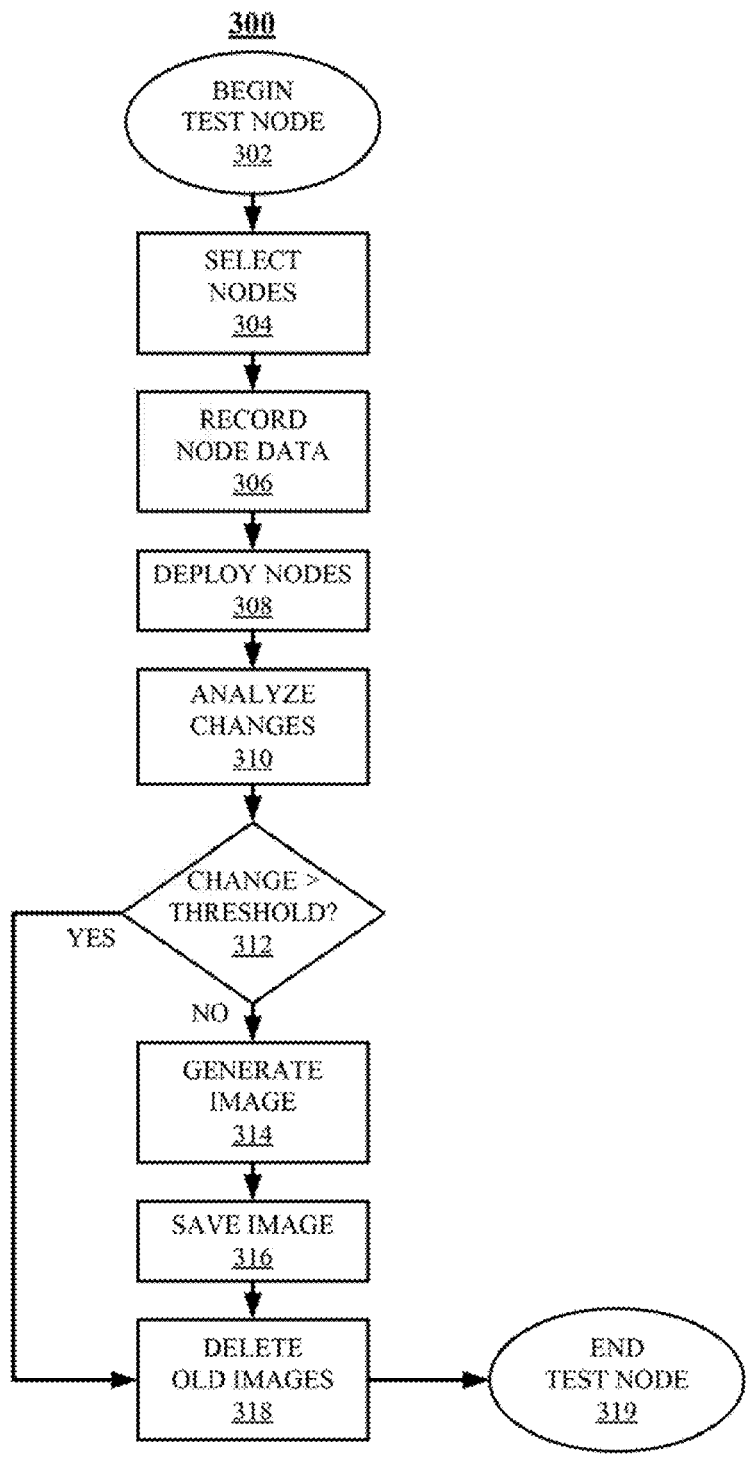
FIG. 4 is a flowchart of an example of a Test Node process that may implement aspects of the claimed subject matter.

FIG. 4 is a flowchart of an example of a Test Node process 300 that may implement aspects of the claimed subject matter. In this example, process 300 is associated with CMS 118 and logic stored on CRSM 112 and executed on one or more processors (not shown) of CPU 104 (FIG. 1) and computing system 102 (FIG. 1).

Process 300 starts in a "Begin Test Node" block 302 and immediately to a "Select Nodes" block 304. During processing associated with block 304, nodes are selected for testing in accordance with the disclosed technology. During processing associated with block a "Record Node Data" block 306, information about the nodes selected during processing associated with block 304 is recorded so that a determination may be made later concerning the amount of change different versions have undergone.

During, processing associated with a "Deploy Nodes" block 308, the nodes are deployed to a test cloud for development and testing. In this example, N1_V1 121 (FIG. 1) is deployed to TCB 150 (FIG. 1) in conjunction with OS_4 154 (FIG. 1). In as similar fashion, N1_V2 122 (FIG. 1) is deployed to TCA 140 (FIG. 1) in conjunction with OS_3 144 (FIG. 1). Once the nodes have undergone testing, during processing associated with an "Analyze Changes" block 310, the nodes are analyzed with respect to each other to determine the amount of change.

During, processing associated with a "Change>Threshold?" block 312, a determination is made as to whether or not the detected change is greater than a threshold amount. If not, control proceeds to a "Generate Image" block 314. During processing associated with block 314, a cloud image of the more recent version of the node is generated for deployment into a service environment (see N1_IM 134, FIG. 1). During processing associated with a "Save Image" block 316, the image generated during processing associated with block 314 is saved in image repository 174 (FIG. 2). Once an image has been saved during processing associated with block 316, or, of during processing associated block 312, a determination is made that the changes exceed a threshold, control proceeds to a "Delete Old Images" block 318. During processing associated with block 318, any existing old versions of the images corresponding to the node for which an image has been generated are deleted. If control is from block 312, any images are deleted because changes to the node have made old images obsolete. If control is from block 316, old images are deleted because a new version has been generated. Of course, if a particular node has not changed at all, a new image may not need to be generated and the old image may not need to be deleted.

Finally, once any old images have been deleted during processing associated with either block 318 or block 320, if, during processing associated with block 312, a determination is made that the detected change has exceed a threshold, control proceeds to an "End Test Node" block 329 during which process 300 is complete.

Figure 5:
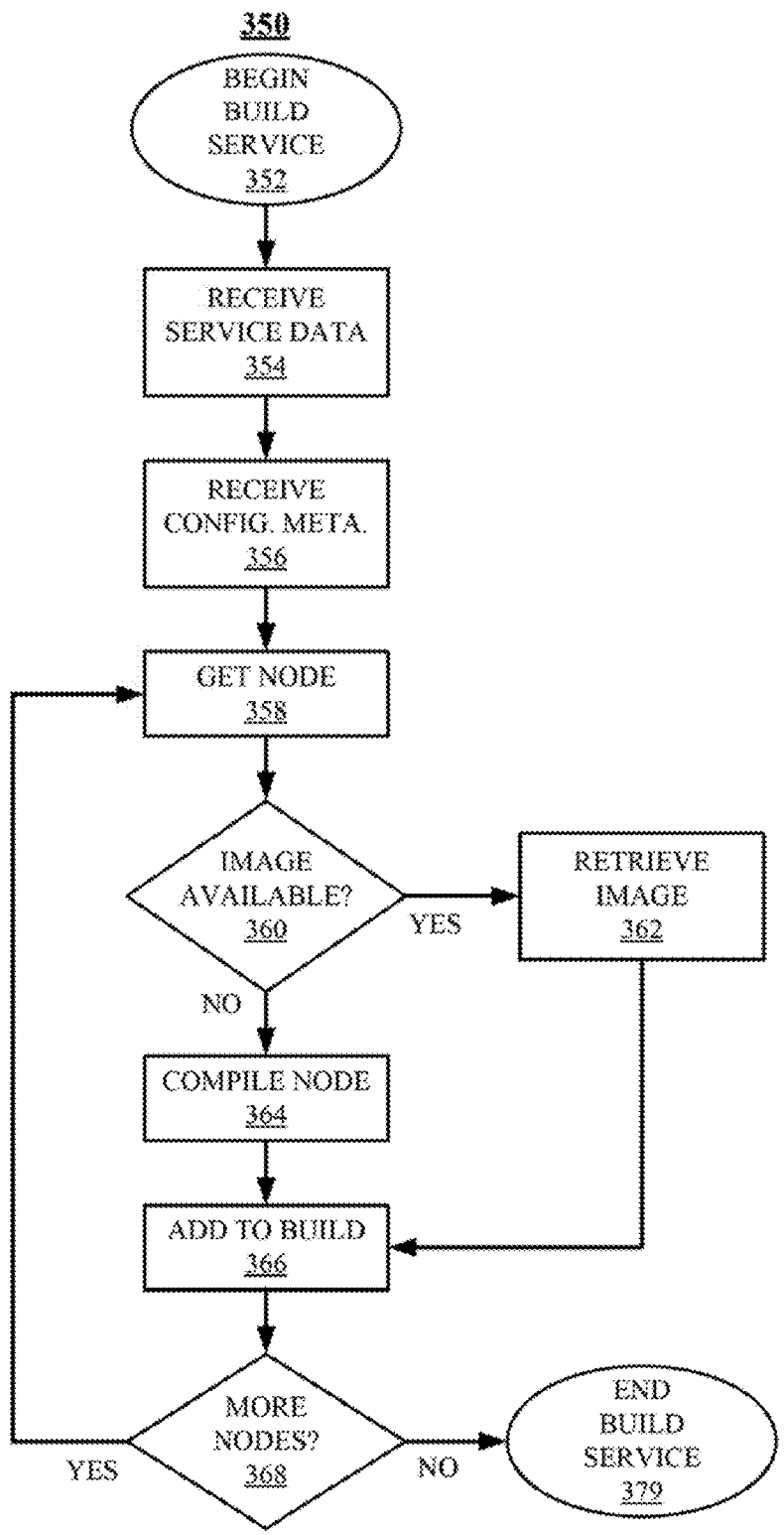
FIG. 5 is a flowchart of an example of a Build Service process that may implement aspects of the claimed subject matter.

FIG. 5 is a flowchart of an example of a Build Application process 350 that may implement aspects of the claimed subject matter. In this example, process 350 is associated with CMS 118 and logic stored on CRSM 112 and executed on one or more processors (not shown) of CPU 104 (FIG. 1) and computing system 102 (FIG. 1).

Process starts in a "Begin Build Service" block 352 and immediately to a "Receive Service Data" block 354. During processing associated with block 354, information related to a service to be deployed is retrieved from node data 172 (FIG. 2). During processing associated with a "Receive Configuration (Config.) Metadata (Meta.)" block 356, information on all nodes identified in data retrieved during processing associated with block 354 is retrieved from configuration metadata 176 (FIG. 2).

During processing associated with block a "Get Node" block 358, one particular node is selected for processing. During processing associated with an "Image Available?" block 360, a determination is made as to whether or not the node selected during processing associated with block 358 has a corresponding image in image repository 174 (FIG. 2). If so, control proceeds to a "Retrieve Image" block 362 and the corresponding image is retrieved for deployment from image repository 174. If not, control proceeds to a "Compile Node" block 364. During processing associated with block 364, the selected node is compiled for deployment in atypical fashion.

During processing associated with an "Add to Build" block 366, the image retrieved during processing associated with block 362 or the node compiled during processing associated with block 364 are added to the build for deployment During processing associated with a "More Nodes?" block 368, a determination is made as to whether or not there are more nodes to be processed. If so, control returns to block 358, the next unprocessed node is retrieved and processing proceeds as described above. If not, control proceeds to an "End Build Service" block 379 during which process 350 is complete.

The terminology used herein is for the purpose of describing particular embodiments only and is not intended to be limiting of the invention. As used herein, the singular forms "a", "an" and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:
1. A method, comprising:
analyzing a first cloud node, associated with a first version of a service, to extract first configuration metadata;
analyzing a second cloud node, associated with a second version, subsequent to the first version, of the service, to extract second configuration metadata;
determining, based upon a comparison of the first configuration metadata and the second configuration metadata, that a first application package common to the first cloud node and the second cloud node has not been modified between the first version and the second version;
generating a first cloud image of first application package for distribution in conjunction with the service in response to the determining that the particular software package has not been modified; and
caching the first cloud image for use in conjunction with the service.

2. The method of claim 1, the determining comprising determining that a change in the first portion between the first version and the second version is less than a threshold amount of change.

3. The method of claim 1, further comprising:
determining, based upon a comparison of the first configuration metadata and the second configuration metadata, that a second application package common to the first cloud node and the second cloud node has been modified between the first version and the second version; and
distributing the second software package in conjunction of the service in response to the determining that the second application package has been modified.

4. The method of claim 1, further comprising:
determining, based upon a comparison of the first configuration metadata and the second configuration metadata, that a second application package common to the first cloud node and the second cloud node has been modified between the first version and the second version; and
distributing the second software package in conjunction of the service in response to the determining that the second application package has been modified.

5. The method of claim 1, further comprising:
analyzing the first cloud node, associated with a third version, subsequent to both the first and second version, of the service, to extract third configuration metadata;
determining, based upon a comparison of the second configuration metadata and the third configuration metadata, that the first software package of the first cloud node has been modified between the second version and the third version;
generating a second cloud image of the first software package for distribution in conjunction with the service in response to the determining that the first software package has been modified;
caching the second cloud image for use in conjunction with the service; and
deleting the cached, first cloud image.

6. The method of claim 5, the determining, based upon a comparison of the second configuration metadata and the third configuration metadata that the first portion of the first cloud node has been modified between the second version and the third version, comprising determining that a change in the first portion between the second version and the third version exceeds a threshold amount of change.

7. The method of claim 1, wherein the software application may be any of a list of computing entities, the list of computing entities comprising:
- an operating system;
- a web application server;
- middleware;
- a database server;
- a reverse proxy;
- a native library;
- a web application; and
- a web application archive (WAR) file.

8. The method of claim 1, further comprising receiving the first cloud node from a deployment test environment for the application.

9. The method of claim 8, further comprising generating, with a source control system, the service in the deployment test environment.

* * * * *